(No Model.)

I. H. RAYNOR.
FEED APPARATUS FOR LOCOMOTIVES.

No. 485,056.  Patented Oct. 25, 1892.

Witnesses.
Robert Everett,
J. A. Rutherford.

Inventor:
Irwin Halpin Raynor.
By James L. Norris,
Atty.

UNITED STATES PATENT OFFICE.

IRWIN HALPIN RAYNOR, OF CLEBURNE, TEXAS, ASSIGNOR OF ONE-HALF TO CHARLIE O. FURGASON, OF SAME PLACE.

FEED APPARATUS FOR LOCOMOTIVES.

SPECIFICATION forming part of Letters Patent No. 485,056, dated October 25, 1892.

Application filed June 20, 1892. Serial No. 437,435. (No model.)

*To all whom it may concern:*

Be it known that I, IRWIN HALPIN RAYNOR, a citizen of the United States, residing at Cleburne, in the county of Johnson and State of Texas, have invented new and useful Improvements in Feed-Water Apparatus for Locomotive-Engines, of which the following is a specification.

In that type of apparatus for feeding the boiler of a locomotive-engine wherein a feed-pipe extends from a tank or tender to an injector a conical strainer is located in the three-way valve-casing for intercepting dirt, leaves, and foreign matter, to prevent the same passing with the feed-water to the boiler. In prior constructions the strainer is not effectually cleaned on its exterior of adhering matter when the three-way valve is operated to permit steam from the boiler to flow through the strainer for the purpose of cleaning the same, and consequently the strainer becomes clogged and the correct action of the apparatus is interfered with to an objectionable extent.

The objects of my invention are to improve the prior apparatus of the character alluded to and to provide novel means whereby jets of steam are caused to strike the exterior surface of the conoidal or conical strainer approximately at right angles to jets of steam flowing from the interior of the strainer through the perforations in the wall thereof, thereby effectually cutting off or removing all extraneous or foreign matter from the exterior surface of the strainer and forcing the dirt, leaves, or other accumulated matter to the ground through the exhaust or discharge port in the three-way valve-casing, so that the strainer is effectually and thoroughly cleaned for further use in feeding the boiler and intercepting leaves and dirt passing with the feed-water toward the boiler.

To accomplish these objects, my invention involves the features of construction and the combination or arrangement of devices hereinafter described and claimed, reference being made to the accompanying drawings, in which—

Figure 1:
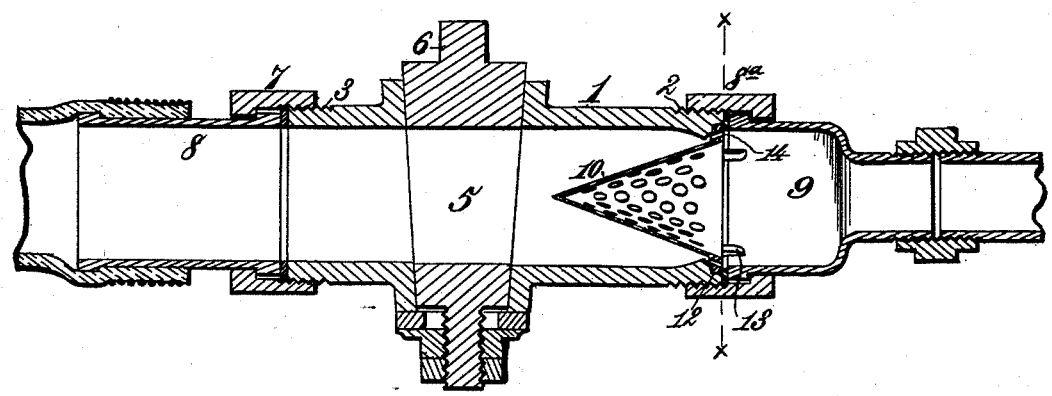
Figure 2:
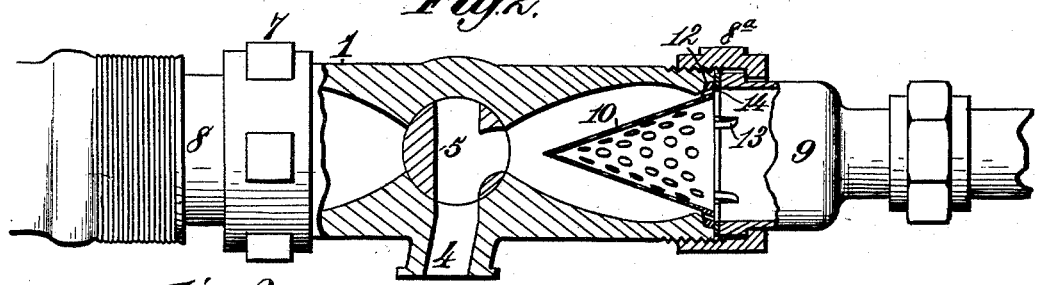
Figure 3:
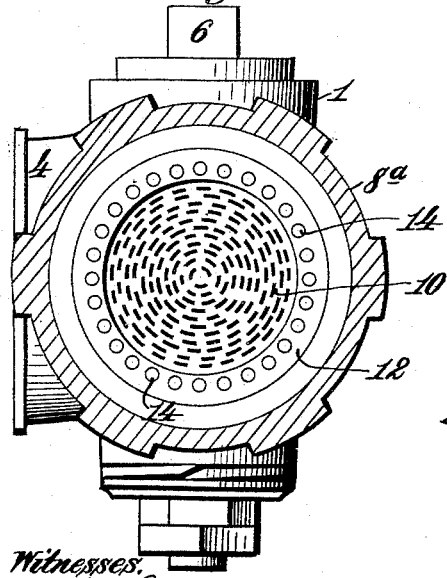
Figure 4:
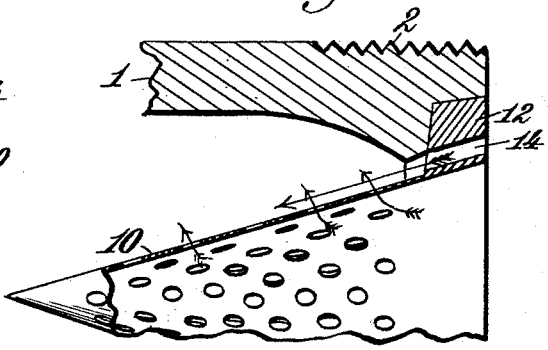

Figure 1 is a vertical longitudinal sectional view of sufficient of the apparatus to illustrate my invention. Fig. 2 is a horizontal sectional view of the same. Fig. 3 is a sectional view taken on the line $xx$, Fig. 1; and Fig. 4 is a detail sectional view, on an enlarged scale, to more clearly exhibit the steam-jet orifices round the base of the conoidal or conical strainer.

In order to enable those skilled in the art to make and use my invention, I will now describe the same in detail, referring to the drawings, wherein—

The numeral 1 indicates a cylindrical valve-casing, having externally screw-threaded ends 2 and 3 and a lateral exhaust or discharge port 4 centrally between its ends, which is governed by a three-way valve 5 of any construction suitable for the conditions required, but preferably formed of a tapering plug set in the valve-casing, and having at one end a head 6, adapted to be engaged by a lever, which extends to the cab of the locomotive in such manner that the engineer can operate the valve. The screw-threaded end 3 of the valve-casing is provided with a union 7, which engages one end of a pipe or tube 8, adapted to lead to a water-tank on the tender of a locomotive-engine. The opposite screw-threaded end 2 of the valve-casing is provided with a union $8^a$, engaging a pipe or tube 9, which is adapted to connect with the usual injector of the locomotive-boiler, all in such manner that by properly adjusting the three-way valve the water from the tank or tender is caused to flow direct to the injector and be forced by the latter into the boiler.

To intercept dirt, leaves, and other foreign matter flowing with the feed-water toward the boiler, a conoidal or conical strainer 10 is inserted into the screw-threaded extremity 2 of the valve-casing, so as to lie between the three-way valve and the pipe or tube 9, which is designed to connect with the injector. The base of the conoidal or conical strainer is suitably provided with a ring or collar 12, arranged in a countersink or annular recess formed in the end of the valve-casing. The pipe or tube 9 may be provided with lateral lugs 13 to bear against the collar or ring, and thereby retain the strainer in proper position. The collar or ring is provided with a series of steam-jet orifices 14, which are so inclined as to stand approximately parallel with the exterior surface of the strainer, and since these steam-jet orifices are located round the base of the conoidal or conical strainer it will be obvious that if the three-way valve be adjusted to the position shown in Fig. 2 and steam be permitted to flow from the boiler through the pipe or tube 9 such steam will pass into the strainer and also through the jet-orifices round the base thereof, so that jets of steam are caused to strike the exterior surface of the strainer approximately at right angles to the jets of steam flowing from the interior of the strainer through the perforations in the wall thereof. By this means all extraneous and foreign matter is effectually cut off or removed from the exterior surface of the strainer and is forced through the exhaust or discharge port 4 to the ground or into the external atmosphere, thus effectually and thoroughly cleaning the strainer for further use in feeding the boiler and intercepting leaves, dirt, and other foreign matter passing with the feed-water toward the boiler.

The shape or configuration of the strainer may be modified without changing the character of my invention; but the steam-jet orifices 14 should be so located round the base of the strainer as to cause jets of steam to strike the exterior surface thereof approximately at right angles to the jets of steam flowing from the interior of the strainer through the perforations in the wall thereof, so that the conjoint action of the jets of steam fulfill all the conditions required to thoroughly and effectually clean the strainer and remove all accumulations from the exterior surface thereof.

The connection of the pipe or tube 8 with the tank or tender and the connection of the pipe or tube 9 with the injector or boiler, and likewise the device or devices for operating the three-way valve, may be widely varied without affecting the spirit of my invention, and therefore I do not deem it necessary to illustrate these features in the drawings, as any of the well-known constructions for this purpose may be adopted.

By locating the three-way valve in the valve-casing between the strainer and the pipe connection for the tank or tender it will be obvious that when the valve is adjusted to the position indicated by Fig. 2 there will be no back-pressure on the water in the tank or tender of the engine, and, furthermore, the dirt, leaves, and other foreign matter will be discharged onto the ground or into the external atmosphere in contradistinction to being forced back to the tank or tender.

By arranging the steam-jet orifices round the base of the conoidal or conical strainer the jets of steam cross each other and effectually cut off everything from the external surface of the strainer, the steam from the inside forcing the dirt and other matter out through the exhaust or discharge port.

Having thus described my invention, what I claim is—

1. In a feed-water apparatus for boilers, the combination, with a valve-casing containing a valve and having pipes or tubes for connecting, respectively, with a tank or tender and an injector or boiler, of a strainer having steam-jet orifices arranged round its base for the purpose of causing jets of steam to strike the exterior surface of the strainer while steam flows from the interior through the perforated wall thereof, substantially as described.

2. In a feed-water apparatus for boilers, the combination, with a valve-casing containing a three-way valve and having pipes or tubes for connecting, respectively, with a tank or tender and an injector or boiler, of a conoidal or conical strainer located in the valve-casing and having a collar or ring at its base which is provided with steam-jet orifices for causing jets of steam to strike the exterior surface of the strainer approximately at right angles to jets of steam flowing from the interior of the strainer through the perforations in the wall thereof, substantially as described.

In testimony whereof I have hereunto set my hand and affixed my seal in presence of two subscribing witnesses.

IRWIN HALPIN RAYNOR. [L. S.]

Witnesses:
W. H. WILSON,
TOM WARREN.